United States Patent
Chen et al.

(10) Patent No.: US 10,939,454 B2
(45) Date of Patent: Mar. 2, 2021

(54) PRIORITIZING COLLIDING TRANSMISSIONS IN LTE AND ULTRA-LOW LATENCY LTE COMMUNICATIONS

(71) Applicant: QUALCOMM Incorporated, San Diego, CA (US)

(72) Inventors: Wanshi Chen, San Diego, CA (US); Shimman Arvind Patel, San Diego, CA (US); Peter Gaal, San Diego, CA (US); Hao Xu, San Diego, CA (US); Yongbin Wei, San Diego, CA (US); Madhavan Srinivasan Vajapeyam, San Diego, CA (US); Aleksandar Damnjanovic, Del Mar, CA (US)

(73) Assignee: QUALCOMM Incorporated, San Diego, CA (US)

( * ) Notice: Subject to any disclaimer, the term of this patent is extended or adjusted under 35 U.S.C. 154(b) by 989 days.

(21) Appl. No.: 14/930,017

(22) Filed: Nov. 2, 2015

(65) Prior Publication Data
US 2016/0174238 A1    Jun. 16, 2016

Related U.S. Application Data

(60) Provisional application No. 62/090,826, filed on Dec. 11, 2014.

(51) Int. Cl.
*H04W 72/10* (2009.01)
*H04W 72/12* (2009.01)
(Continued)

(52) U.S. Cl.
CPC .......... *H04W 72/10* (2013.01); *H04L 1/0045* (2013.01); *H04L 5/0048* (2013.01);
(Continued)

(58) Field of Classification Search
None
See application file for complete search history.

(56) References Cited

U.S. PATENT DOCUMENTS 9,820,273 B2    11/2017   Zhang et al.
2007/0253364 A1*  11/2007   Wandel ............... H04L 12/66
                                                  370/329
(Continued)

FOREIGN PATENT DOCUMENTS

CN    101005693 A    7/2007
CN    101400072 A    4/2009
(Continued)

OTHER PUBLICATIONS

International Search Report and Written Opinion—PCT/US2015/058822—ISA/EPO—May 4, 2016. 16 Total Pages.
(Continued)

*Primary Examiner* — Walter J Divito
*Assistant Examiner* — Camquyen Thai
(74) *Attorney, Agent, or Firm* — Arent Fox LLP

(57) ABSTRACT

Various aspects described herein relate to receiving a first communication over a first set of resources based on a first transmission time interval (TTI), receiving a second communication over a second set of resources based on a second TTI, where the second TTI is smaller than the first TTI, and where the second set of resources overlap the first set of resources defining a common set of resources, and determining whether to prioritize decoding of the first communication over the second communication.

20 Claims, 8 Drawing Sheets

(51) Int. Cl.
  *H04L 1/00* (2006.01)
  *H04L 5/00* (2006.01)
  *H04W 72/00* (2009.01)
  *H04W 72/04* (2009.01)
  *H04W 16/14* (2009.01)
  *H04W 88/06* (2009.01)

(52) U.S. Cl.
  CPC ....... *H04W 72/005* (2013.01); *H04W 72/042* (2013.01); *H04W 72/0446* (2013.01); *H04W 72/1215* (2013.01); *H04L 1/0003* (2013.01); *H04L 1/0009* (2013.01); *H04W 16/14* (2013.01); *H04W 88/06* (2013.01)

(56) References Cited

U.S. PATENT DOCUMENTS

| | | | | |
|---|---|---|---|---|
| 2008/0095110 | A1* | 4/2008 | Montojo | H04L 5/0053 370/330 |
| 2009/0175245 | A1* | 7/2009 | Harada | H04L 1/0007 370/336 |
| 2009/0296833 | A1* | 12/2009 | Sawahashi | H04L 1/0007 375/260 |
| 2010/0034158 | A1 | 2/2010 | Meylan | |
| 2010/0284379 | A1* | 11/2010 | Bitran | H04L 5/0087 370/338 |
| 2011/0034165 | A1* | 2/2011 | Hsu | H04W 36/0088 455/423 |
| 2011/0059718 | A1* | 3/2011 | Wang | H04W 4/90 455/404.1 |
| 2012/0155561 | A1* | 6/2012 | Seo | H04B 7/15542 375/260 |
| 2012/0163307 | A1 | 6/2012 | Wang et al. | |
| 2012/0275380 | A1* | 11/2012 | Chin | H04W 68/00 370/328 |
| 2013/0044664 | A1* | 2/2013 | Nory | H04L 1/0045 370/311 |
| 2013/0114419 | A1 | 5/2013 | Chen et al. | |
| 2013/0114532 | A1 | 5/2013 | Choi et al. | |
| 2013/0230017 | A1* | 9/2013 | Papasakellariou | H04W 72/0406 370/330 |
| 2013/0294411 | A1 | 11/2013 | Tsai et al. | |
| 2014/0226607 | A1* | 8/2014 | Holma | H04L 1/1812 370/329 |
| 2020/0214019 | A1 | 7/2020 | Chen et al. | |

FOREIGN PATENT DOCUMENTS

| | | | |
|---|---|---|---|
| EP | 2816858 A1 * | 12/2014 | ............. H04L 5/001 |
| JP | 5513436 B2 | 6/2014 | |
| WO | 2011109544 A1 | 9/2011 | |

OTHER PUBLICATIONS

Partial International Search Report—PCT/US2015/058822—ISA/EPO—dated Feb. 25, 2016. 6 Total Pages.
Taiwan Search Report—TW104136242—TIPO—dated Feb. 21, 2019.
European Search Report—EP19208814—Search Authority—The Hague—Nov. 3, 2020.
Taiwan Search Report—TW108121727—TIPO—Dec. 31, 2019.

* cited by examiner

PRIORITIZING COLLIDING TRANSMISSIONS IN LTE AND ULTRA-LOW LATENCY LTE COMMUNICATIONS

CLAIM OF PRIORITY UNDER 35 U.S.C. § 119

The present Application for Patent claims priority to Provisional Application No. 62/090,826 entitled "PRIORITIZING COLLIDING TRANSMISSIONS IN LTE AND ULTRA-LOW LATENCY LTE COMMUNICATIONS" filed Dec. 11, 2014, which is assigned to the assignee hereof and hereby expressly incorporated by reference herein.

BACKGROUND

Described herein are aspects generally related to communication systems, and more particularly, to prioritizing communications of wireless technologies.

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power). Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example of a telecommunication standard is Long Term Evolution (LTE). LTE is a set of enhancements to the Universal Mobile Telecommunications System (UMTS) mobile standard promulgated by Third Generation Partnership Project (3GPP). It is designed to better support mobile broadband Internet access by improving spectral efficiency, lower costs, improve services, make use of new spectrum, and better integrate with other open standards using OFDMA on the downlink (DL), SC-FDMA on the uplink (UL), and multiple-input multiple-output (MIMO) antenna technology. However, as the demand for mobile broadband access continues to increase, further improvements in LTE technology may be desired. Preferably, these improvements should be applicable to other multi-access technologies and the telecommunication standards that employ these technologies.

In wireless communication systems employing legacy LTE, a plurality of UEs served by a particular eNodeB may be scheduled resources for communicating with the eNodeB over one or more channels using transmission time intervals (TTI) on the order of a 1 millisecond subframe. As UE capabilities and demand for bandwidth increases, lower latency in communications may be desired.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

According to an example, a method of wireless communications is provided. The method includes receiving a first communication over a first set of resources based on a first transmission time interval (TTI), and receiving a second communication over a second set of resources based on a second TTI. The second TTI is smaller than the first TTI, and the second set of resources overlap the first set of resources defining a common set of resources. The method also includes determining whether to prioritize decoding of the first communication over the second communication.

In other aspects, a user equipment for wireless communication is provided. The user equipment includes a transceiver, at least one processor communicatively coupled with the transceiver, via a bus, for communicating signals in a wireless network, and a memory communicatively coupled with the at least one processor and/or the transceiver via the bus. The at least one processor and the memory are operable to receive, via the transceiver, a first communication over a first set of resources based on a first TTI, and to receive, via the transceiver, a second communication over a second set of resources based on a second TTI. The second TTI is smaller than the first TTI, and the second set of resources overlap the first set of resources defining a common set of resources. The at least one processor and the memory are also operable to determine whether to prioritize decoding of the first communication over the second communication.

In another example, a method of wireless communications is provided. The method includes allocating a first set of resources for transmitting a first communication according to a first TTI, and allocating a second set of resources for transmitting a second communication according to a second TTI. The second TTI is smaller than the first TTI. The method also includes transmitting a first resource grant corresponding to the first set of resources over a downlink control channel, and transmitting a second resource grant corresponding to the second set of resources over the downlink control channel.

In other aspects, an evolved Node B (eNB) for wireless communication is provided. The eNB includes a transceiver, at least one processor communicatively coupled with the transceiver via a bus for communicating signals in a wireless network, and a memory communicatively coupled with the at least one processor and/or the transceiver via the bus. The at least one processor and the memory are operable to allocate a first set of resources for transmitting a first communication according to a first TTI, and to allocate a second set of resources for transmitting a second communication according to a second TTI. The second TTI is smaller than the first TTI. The at least one processor and the memory are also operable to transmit, via the transceiver, a first resource grant corresponding to the first set of resources over a downlink control channel, and transmit, via the transceiver, a second resource grant corresponding to the second set of resources over the downlink control channel.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

In order to facilitate a fuller understanding of aspects described herein, reference is now made to the accompanying drawings, in which like elements are referenced with like numerals. These drawings should not be construed as limiting the present disclosure, but are intended to be illustrative only.

DETAILED DESCRIPTION

Figure 1:
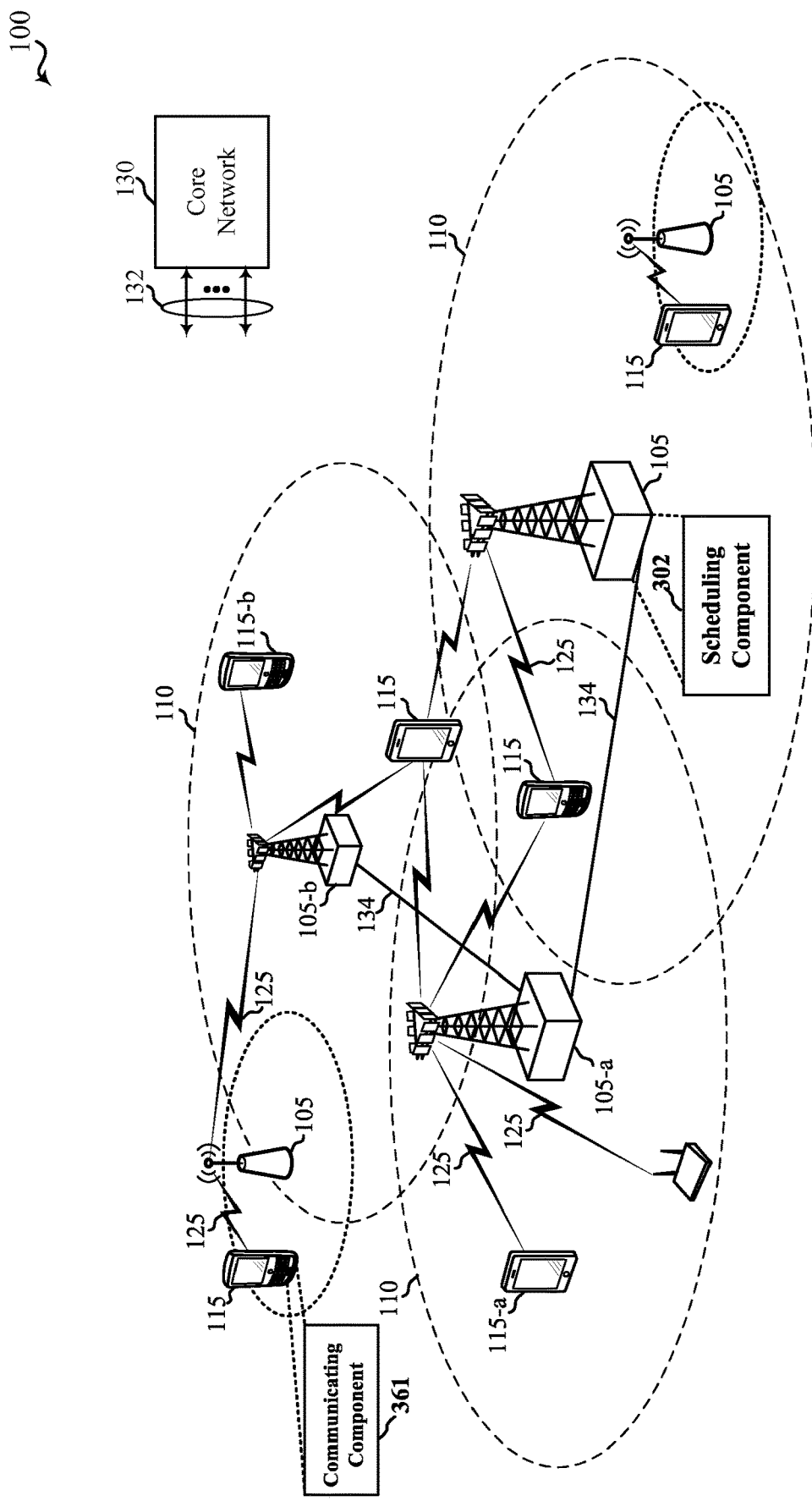
FIG. 1 shows a block diagram conceptually illustrating an example of a telecommunications system, in accordance with aspects described herein.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several aspects of telecommunication systems will now be presented with reference to various apparatus and methods. These apparatus and methods will be described in the following detailed description and illustrated in the accompanying drawings by various blocks, modules, components, circuits, steps, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented with a "processing system" that includes one or more processors. Examples of processors include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise.

Accordingly, in one or more aspects, the functions described may be implemented in hardware, software, firmware, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Disk and disc, as used herein, includes compact disc (CD), laser disc, optical disc, digital versatile disc (DVD), and floppy disk where disks usually reproduce data magnetically, while discs reproduce data optically with lasers. Combinations of the above should also be included within the scope of computer-readable media.

Described herein are various aspects related to prioritizing colliding communications corresponding to a legacy communication technology and an ultra low latency (ULL) communication technology, where the communication technologies may be based on different length transmission time intervals (TTI) (e.g., the ULL communication technology having a shorter TTI duration than the legacy communication technology). For example, a legacy LTE technology may utilize a TTI having a duration of a subframe defined in LTE, where an ultra low latency (ULL) LTE technology can be based on a TTI having a duration less than a subframe (e.g., one symbol, two symbols, a subframe slot, etc.). In this regard, a lower latency in communications is achieved by the shorter, more frequent TTI. In some instances, a legacy technology may be a legacy cellular technology different from a legacy LTE technology. A network may support both legacy and ULL communication technologies over similar frequency bands, and thus may potentially schedule colliding downlink resources over which one or more user equipment (UE) receive signals from the network. For example, the collision of downlink resources may be caused in part by the shortened TTI associated with ULL, as resources may be allocated more frequently than in legacy communication technology, and resources scheduled for legacy communication technology transmission may be at least partially also scheduled for ULL communication technology transmission to meet scheduling demands in the ULL communication technology. It is to be appreciated that LTE and ULL LTE are used as examples of the legacy and ULL communication technologies herein, respectively, but it is to be appreciated that the foregoing concepts can be applied to substantially any combination of communication technologies where one communication technology has a shorter TTI than another communication technology.

In one example, a UE may prioritize receiving of communications that collide over the communication technologies (e.g., legacy LTE and ULL LTE resources) based on one or more rules configured in the UE, which may be based at least in part on a type of the communication over the resources. For example, where the legacy technology communication includes broadcast data, a demodulation reference signal (DM-RS), and/or the like, the UE may prioritize receipt of the legacy technology communication in related resources that overlap. In another example, the network supporting legacy and ULL technologies and transmitting the associated communications can configure the UE with the resources, and can avoid overlapping legacy and ULL technology resources and/or can otherwise instruct the UE on prioritizing legacy or ULL technology communications over certain overlapping resources.

Referring first to FIG. 1, a diagram illustrates an example of a wireless communications system 100, in accordance with aspects described herein. The wireless communications system 100 includes a plurality of access points (e.g., base stations, eNBs, or WLAN access points) 105, a number of user equipment (UEs) 115, and a core network 130. Access points 105 may include a scheduling component 302 configured to schedule and communicate with UEs 115 using a legacy communication technology and a ULL communication technology that is based on a smaller TTI (e.g., legacy LTE and ULL LTE). Similarly, one or more of UEs 115 may include a communicating component 361 configured to prioritize communications of the legacy communication technology (e.g., LTE) and the ULL communication technology (e.g., ULL LTE). Some of the access points 105 may communicate with the UEs 115 under the control of a base station controller (not shown), which may be part of the core network 130 or the certain access points 105 (e.g., base stations or eNBs) in various examples. Access points 105 may communicate control information and/or user data with the core network 130 through backhaul links 132. In examples, the access points 105 may communicate, either directly or indirectly, with each other over backhaul links 134, which may be wired or wireless communication links. The wireless communications system 100 may support operation on multiple carriers (waveform signals of different frequencies). Multi-carrier transmitters can transmit modulated signals simultaneously on the multiple carriers. For example, each communication link 125 may be a multi-carrier signal modulated according to the various radio technologies described above. Each modulated signal may be sent on a different carrier and may carry control information (e.g., reference signals, control channels, etc.), overhead information, data, etc.

In some examples, at least a portion of the wireless communications system 100 may be configured to operate on multiple hierarchical layers in which one or more of the UEs 115 and one or more of the access points 105 may be configured to support transmissions on a hierarchical layer that has a reduced latency with respect to another hierarchical layer. In some examples, a hybrid UE 115-a may communicate with access point 105-a on both a first hierarchical layer that supports first layer transmissions using a first TTI (which may relate to a "legacy communication technology") and a second hierarchical layer that supports second layer transmissions using a second TTI, which may be shorter than the first TTI (which may relate to a "ULL communication technology").

In other examples, a second layer UE 115-b may communicate with access point 105-b on the second hierarchical layer only. Thus, hybrid UE 115-a and second layer UE 115-b may belong to a second class of UEs 115 that may communicate on the second hierarchical layer, while legacy UEs 115 may belong to a first class of UEs 115 that may communicate on the first hierarchical layer only. Access point 105-b and UE 115-b may communicate on the second hierarchical layer through transmissions of subframes of the second subframe type. Access point 105-b may transmit communications related to the first or second hierarchical layer only or may transmit communications for both the first and second hierarchical layers. Where an access point 105-b supports both the first and second hierarchical layers, communicating component 361 can be configured to prioritize communications received from the access point 105-b that relate to the first and second hierarchical layers, as described herein.

The access points 105 may wirelessly communicate with the UEs 115 via one or more access point antennas. Each of the access points 105 sites may provide communication coverage for a respective coverage area 110. In some examples, access points 105 may be referred to as a base transceiver station, a radio base station, a radio transceiver, a basic service set (BSS), an extended service set (ESS), a NodeB, eNodeB, Home NodeB, a Home eNodeB, or some other suitable terminology. The coverage area 110 for a base station may be divided into sectors making up only a portion of the coverage area (not shown). The wireless communications system 100 may include access points 105 of different types (e.g., macro, micro, and/or pico base stations). The access points 105 may also utilize different radio technologies, such as cellular and/or WLAN radio access technologies (RAT). The access points 105 may be associated with the same or different access networks or operator deployments. The coverage areas of different access points 105, including the coverage areas of the same or different types of access points 105, utilizing the same or different radio technologies, and/or belonging to the same or different access networks, may overlap.

In network communication systems using LTE/LTE-A and/or ULL LTE communication technologies, the terms evolved Node B (eNodeB or eNB) may be generally used to describe the access points 105. The wireless communications system 100 may be a Heterogeneous LTE/LTE-A/ULL LTE network in which different types of access points provide coverage for various geographical regions. For example, each access point 105 may provide communication coverage for a macro cell, a pico cell, a femto cell, and/or other types of cell. Small cells such as pico cells, femto cells, and/or other types of cells may include low power nodes or LPNs. A macro cell generally covers a relatively large geographic area (e.g., several kilometers in radius) and may allow unrestricted access by UEs 115 with service subscriptions with the network provider. A small cell would generally cover a relatively smaller geographic area and may allow unrestricted access by UEs 115 with service subscriptions with the network provider, for example, and in addition to unrestricted access, may also provide restricted access by UEs 115 having an association with the small cell (e.g., UEs in a closed subscriber group (CSG), UEs for users in the home, and the like). An eNB for a macro cell may be referred to as a macro eNB. An eNB for a small cell may be referred to as a small cell eNB. An eNB may support one or multiple (e.g., two, three, four, and the like) cells.

The core network 130 may communicate with the eNBs or other access points 105 via one or more backhaul links 132 (e.g., S1 interface, etc.). The access points 105 may also communicate with one another, e.g., directly or indirectly via backhaul links 134 (e.g., X2 interface, etc.) and/or via backhaul links 132 (e.g., through core network 130). The wireless communications system 100 may support synchronous or asynchronous operation. For synchronous operation, the access points 105 may have similar frame timing, and transmissions from different access points 105 may be approximately aligned in time. For asynchronous operation, the access points 105 may have different frame timing, and transmissions from different access points 105 may not be aligned in time. Furthermore, transmissions in the first hierarchical layer and second hierarchical layer may or may not be synchronized among access points 105. The techniques described herein may be used for either synchronous or asynchronous operations.

The UEs 115 are dispersed throughout the wireless communications system 100, and each UE 115 may be stationary or mobile. A UE 115 may also be referred to by those skilled in the art as a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology. A UE 115 may be a cellular phone, a personal digital assistant (PDA), a wireless modem, a wireless communication device, a handheld device, a tablet computer, a laptop computer, a cordless phone, a wearable item such as a watch or glasses, a wireless local loop (WLL) station, or the like. A UE 115 may be able to communicate with macro eNodeBs, small cell eNodeBs, relays, and the like. A UE 115 may also be able to communicate over different access networks, such as cellular or other WWAN access networks, or WLAN access networks.

The communication links 125 shown in wireless communications system 100 may include uplink (UL) transmissions from a UE 115 to an access point 105, and/or downlink (DL) transmissions, from an access point 105 to a UE 115. The downlink transmissions may also be called forward link transmissions while the uplink transmissions may also be called reverse link transmissions. The communication links 125 may carry transmissions of each hierarchical layer which, in some examples, may be multiplexed in the communication links 125. The UEs 115 may be configured to collaboratively communicate with multiple access points 105 through, for example, Multiple Input Multiple Output (MIMO), carrier aggregation (CA), Coordinated Multi-Point (CoMP), or other schemes. MIMO techniques use multiple antennas on the access points 105 and/or multiple antennas on the UEs 115 to transmit multiple data streams. Carrier aggregation may utilize two or more component carriers on a same or different serving cell for data transmission. CoMP may include techniques for coordination of transmission and reception by a number of access points 105 to improve overall transmission quality for UEs 115 as well as increasing network and spectrum utilization.

As mentioned, in some examples access points 105 and UEs 115 may utilize carrier aggregation to transmit on multiple carriers. In some examples, access points 105 and UEs 115 may concurrently transmit in a first hierarchical layer, within a frame, one or more subframes each having a first subframe type using two or more separate carriers. Each carrier may have a bandwidth of, for example, 20 MHz, although other bandwidths may be utilized. Hybrid UE 115-a, and/or second layer UE 115-b may, in certain examples, receive and/or transmit one or more subframes in a second hierarchical layer utilizing a single carrier that has a bandwidth greater than a bandwidth of one or more of the separate carriers. For example, if four separate 20 MHz carriers are used in a carrier aggregation scheme in the first hierarchical layer, a single 80 MHz carrier may be used in the second hierarchical layer. The 80 MHz carrier may occupy a portion of the radio frequency spectrum that at least partially overlaps the radio frequency spectrum used by one or more of the four 20 MHz carriers. In some examples, scalable bandwidth for the second hierarchical layer type may be combined techniques to provide shorter RTTs such as described above, to provide further enhanced data rates.

Each of the different operating modes that may be employed by wireless communications system 100 may operate according to frequency division duplexing (FDD) or time division duplexing (TDD). In some examples, different hierarchical layers may operate according to different TDD or FDD modes. For example, a first hierarchical layer may operate according to FDD while a second hierarchical layer may operate according to TDD. In some examples, OFDMA communications signals may be used in the communication links 125 for LTE downlink transmissions for each hierarchical layer, while single carrier frequency division multiple access (SC-FDMA) communications signals may be used in the communication links 125 for LTE uplink transmissions in each hierarchical layer. Additional details regarding implementation of hierarchical layers in a system such as the wireless communications system 100, as well as other features and functions related to communications in such systems, are provided below with reference to the following figures.

Figure 2:
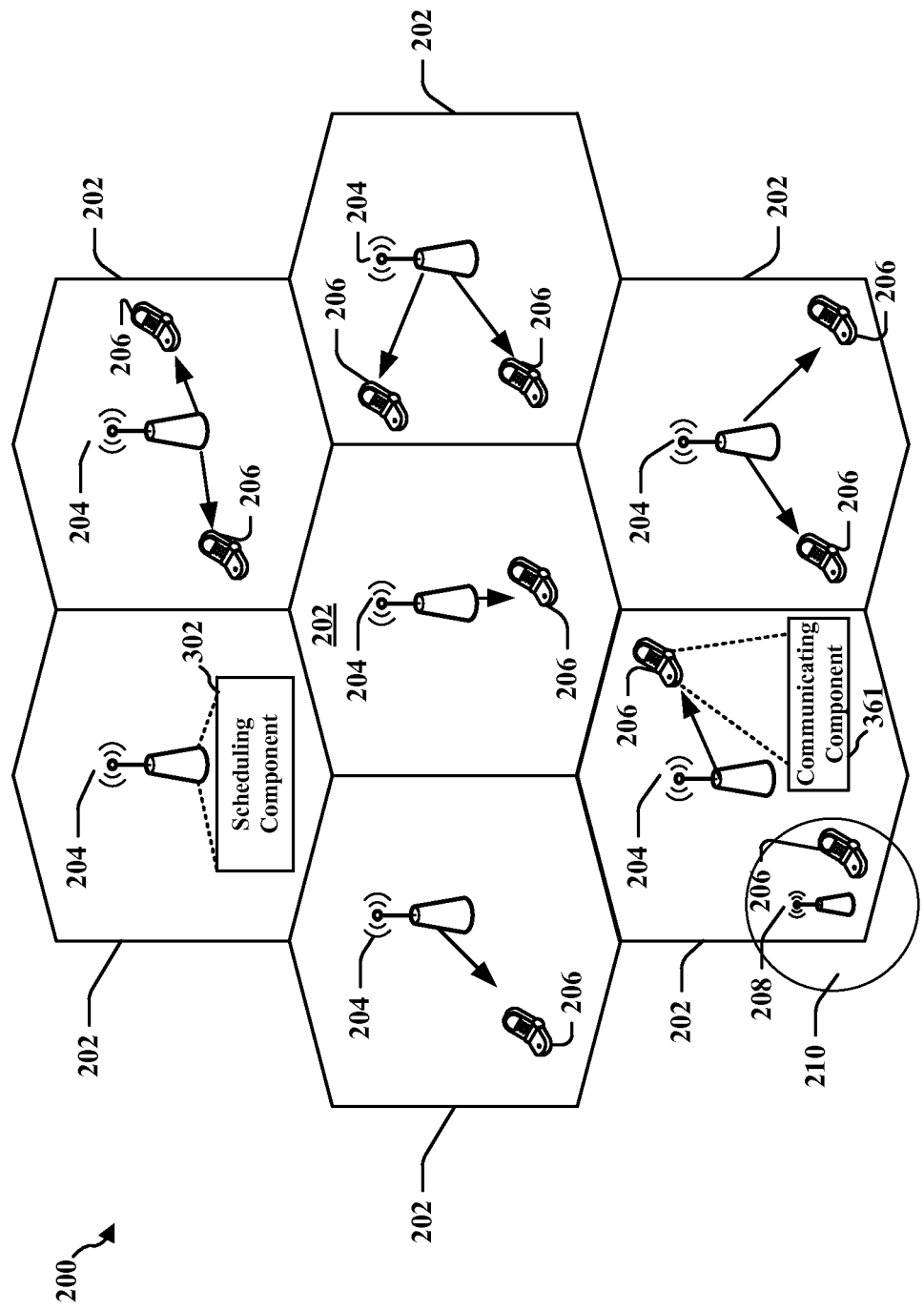
FIG. 2 is a diagram illustrating an example of an access network.

FIG. 2 is a diagram illustrating an example of an access network 200 in an LTE or ULL LTE network architecture. In this example, the access network 200 is divided into a number of cellular regions (cells) 202. One or more lower power class eNBs 208 may have cellular regions 210 that overlap with one or more of the cells 202. The lower power class eNB 208 may be a femto cell (e.g., home eNB (HeNB)), pico cell, micro cell, or remote radio head (RRH). The macro eNBs 204 are each assigned to a respective cell 202 and are configured to provide an access point to the core network 130 for all the UEs 206 in the cells 202. In an aspect, eNBs 204 may include scheduling component 302 configured to schedule and communicate with UEs 206 using a legacy communication technology and a ULL communication technology that is based on a smaller TTI (e.g., legacy LTE and ULL LTE). Similarly, one or more of UEs 206 may include a communicating component 361 configured to prioritize communications of the legacy communication technology (e.g., LTE) and the ULL communication technology (e.g., ULL LTE). There is no centralized controller in this example of an access network 200, but a centralized controller may be used in alternative configurations. The eNBs 204 are responsible for all radio related functions including radio bearer control, admission control, mobility control, scheduling, security, and connectivity to one or more components of core network 130.

The modulation and multiple access scheme employed by the access network 200 may vary depending on the particular telecommunications standard being deployed. In LTE or ULL LTE applications, OFDM may be used on the DL and SC-FDMA may be used on the UL to support both frequency division duplexing (FDD) and time division duplexing (TDD). As those skilled in the art will readily appreciate from the detailed description to follow, the various concepts presented herein are well suited for LTE applications. However, these concepts may be readily extended to other telecommunication standards employing other modulation and multiple access techniques. By way of example, these concepts may be extended to Evolution-Data Optimized (EV-DO) or Ultra Mobile Broadband (UMB). EV-DO and UMB are air interface standards promulgated by the 3rd Generation Partnership Project 2 (3GPP2) as part of the CDMA2000 family of standards and employs CDMA to provide broadband Internet access to mobile stations. These concepts may also be extended to Universal Terrestrial Radio Access (UTRA) employing Wideband-CDMA (W-CDMA) and other variants of CDMA, such as TD-SCDMA; Global System for Mobile Communications (GSM) employing TDMA; and Evolved UTRA (E-UTRA), IEEE 802.11 (Wi-Fi), IEEE 802.16 (WiMAX), IEEE 802.20, and Flash-OFDM employing OFDMA. UTRA, E-UTRA, UMTS, LTE and GSM are described in documents from the 3GPP organization. CDMA2000 and UMB are described in documents from the 3GPP2 organization. The actual wireless communication standard and the multiple access technology employed will depend on the specific application and the overall design constraints imposed on the system.

The eNBs 204 may have multiple antennas supporting MIMO technology. The use of MIMO technology enables the eNBs 204 to exploit the spatial domain to support spatial multiplexing, beamforming, and transmit diversity. Spatial multiplexing may be used to transmit different streams of data simultaneously on the same frequency. The data steams may be transmitted to a single UE 206 to increase the data rate or to multiple UEs 206 to increase the overall system capacity. This is achieved by spatially precoding each data stream (i.e., applying a scaling of an amplitude and a phase) and then transmitting each spatially precoded stream through multiple transmit antennas on the DL. The spatially precoded data streams arrive at the UE(s) 206 with different spatial signatures, which enables each of the UE(s) 206 to recover the one or more data streams destined for that UE 206. On the UL, each UE 206 transmits a spatially precoded data stream, which enables the eNB 204 to identify the source of each spatially precoded data stream.

Spatial multiplexing is generally used when channel conditions are good. When channel conditions are less favorable, beamforming may be used to focus the transmission energy in one or more directions. This may be achieved by spatially precoding the data for transmission through multiple antennas. To achieve good coverage at the edges of the cell, a single stream beamforming transmission may be used in combination with transmit diversity.

In the detailed description that follows, various aspects of an access network will be described with reference to a MIMO system supporting OFDM on the DL. OFDM is a spread-spectrum technique that modulates data over a number of subcarriers within an OFDM symbol. The subcarriers are spaced apart at precise frequencies. The spacing provides "orthogonality" that enables a receiver to recover the data from the subcarriers. In the time domain, a guard interval (e.g., cyclic prefix) may be added to each OFDM symbol to combat inter-OFDM-symbol interference. The UL may use SC-FDMA in the form of a DFT-spread OFDM signal to compensate for high peak-to-average power ratio (PAPR).

Figure 3:
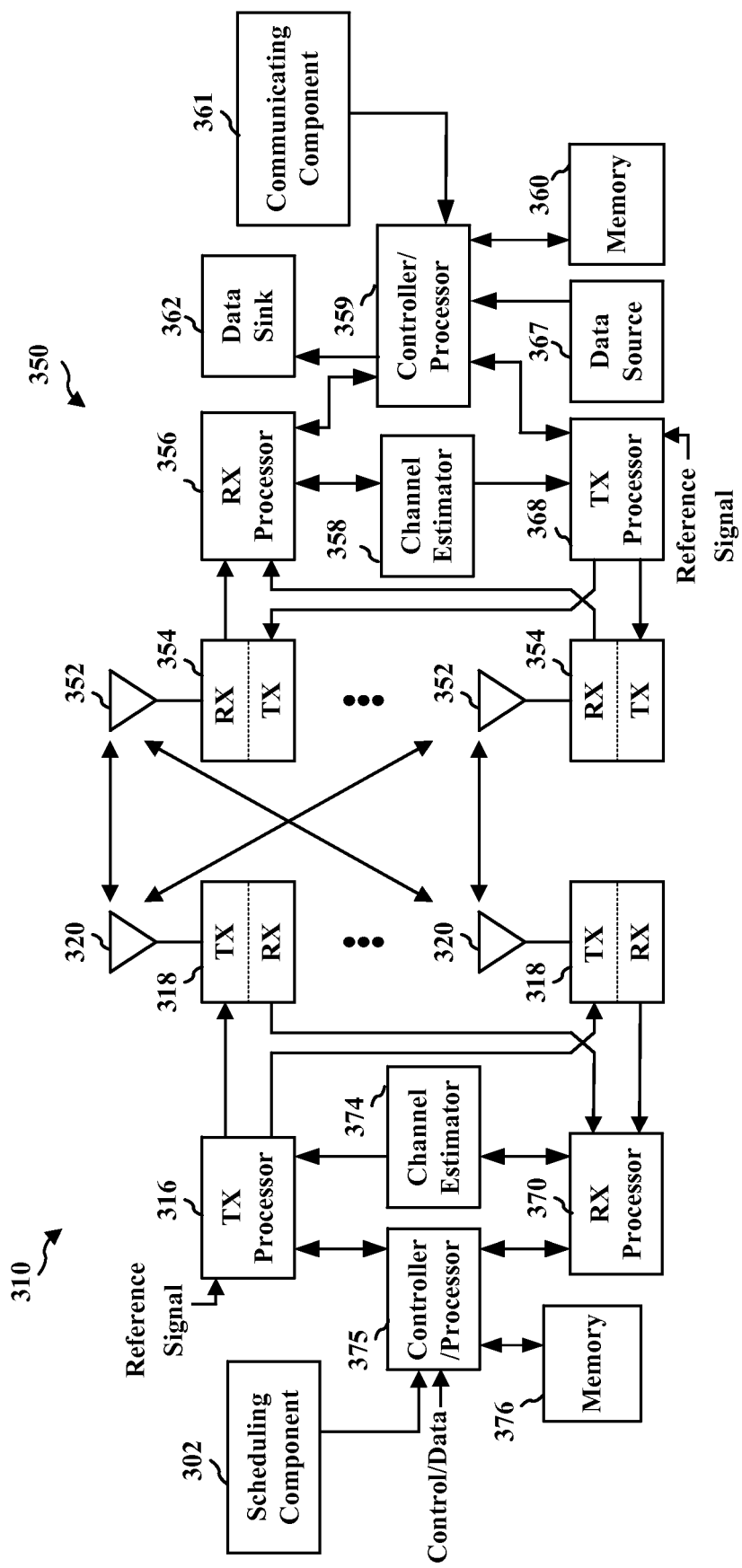
FIG. 3 is a diagram illustrating an example of an evolved Node B and user equipment in an access network.

FIG. 3 is a block diagram of an eNB 310 in communication with a UE 350 in an access network. In the DL, upper layer packets from the core network are provided to a controller/processor 375. The controller/processor 375 implements the functionality of the L2 layer. In the DL, the controller/processor 375 provides header compression, ciphering, packet segmentation and reordering, multiplexing between logical and transport channels, and radio resource allocations to the UE 350 based on various priority metrics. The controller/processor 375 is also responsible for HARQ operations, retransmission of lost packets, and signaling to the UE 350.

The transmit (TX) processor 316 implements various signal processing functions for the L1 layer (i.e., physical layer). The signal processing functions includes coding and interleaving to facilitate forward error correction (FEC) at the UE 350 and mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols are then split into parallel streams. Each stream is then mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 374 may be used to determine the coding and modulation scheme, as well as for spatial processing. The channel estimate may be derived from a reference signal and/or channel condition feedback transmitted by the UE 350. Each spatial stream is then provided to a different antenna 320 via a separate transmitter 318TX. Each transmitter 318TX modulates an RF carrier with a respective spatial stream for transmission. In addition, eNB 310 may include scheduling component 302 configured to schedule and communicate with UEs 350 using a legacy communication technology and a ULL communication technology that is based on a smaller TTI (e.g., legacy LTE and ULL LTE).

At the UE 350, each receiver 354RX receives a signal through its respective antenna 352. Each receiver 354RX recovers information modulated onto an RF carrier and provides the information to the receive (RX) processor 356. The RX processor 356 implements various signal processing functions of the L1 layer. The RX processor 356 performs spatial processing on the information to recover any spatial streams destined for the UE 350. If multiple spatial streams are destined for the UE 350, they may be combined by the RX processor 356 into a single OFDM symbol stream. The RX processor 356 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, is recovered and demodulated by determining the most likely signal constellation points transmitted by the eNB 310. These soft decisions may be based on channel estimates computed by the channel estimator 358. The soft decisions are then decoded and deinterleaved to recover the data and control signals that were originally transmitted by the eNB 310 on the physical channel. The data and control signals are then provided to the controller/processor 359.

The controller/processor 359 implements the L2 layer. The controller/processor can be associated with a memory 360 that stores program codes and data. The memory 360 may be referred to as a computer-readable medium. In the UL, the controller/processor 359 provides demultiplexing between transport and logical channels, packet reassembly, deciphering, header decompression, control signal processing to recover upper layer packets from the core network. The upper layer packets are then provided to a data sink 362, which represents all the protocol layers above the L2 layer. Various control signals may also be provided to the data sink 362 for L3 processing. The controller/processor 359 is also responsible for error detection using an acknowledgement (ACK) and/or negative acknowledgment (NACK) protocol to support HARQ operations. In addition, communicating component 361 configured to prioritize communications of the legacy communication technology (e.g., LTE) and the ULL communication technology (e.g., ULL LTE).

In the UL, a data source 367 is used to provide upper layer packets to the controller/processor 359. The data source 367 represents all protocol layers above the L2 layer. Similar to the functionality described in connection with the DL transmission by the eNB 310, the controller/processor 359 implements the L2 layer for the user plane and the control plane by providing header compression, ciphering, packet segmentation and reordering, and multiplexing between logical and transport channels based on radio resource allocations by the eNB 310. The controller/processor 359 is also responsible for HARQ operations, retransmission of lost packets, and signaling to the eNB 310.

Channel estimates derived by a channel estimator 358 from a reference signal or feedback transmitted by the eNB 310 may be used by the TX processor 368 to select the appropriate coding and modulation schemes, and to facilitate spatial processing. The spatial streams generated by the TX processor 368 are provided to different antenna 352 via separate transmitters 354TX. Each transmitter 354TX modulates an RF carrier with a respective spatial stream for transmission.

The UL transmission is processed at the eNB 310 in a manner similar to that described in connection with the receiver function at the UE 350. Each receiver 318RX receives a signal through its respective antenna 320. Each receiver 318RX recovers information modulated onto an RF carrier and provides the information to a RX processor 370. The RX processor 370 may implement the L1 layer.

The controller/processor 375 implements the L2 layer. The controller/processor 375 can be associated with a memory 376 that stores program codes and data. The memory 376 may be referred to as a computer-readable medium. In the UL, the controller/processor 375 provides demultiplexing between transport and logical channels, packet reassembly, deciphering, header decompression, control signal processing to recover upper layer packets from the UE 350. Upper layer packets from the controller/processor 375 may be provided to the core network. The controller/processor 375 is also responsible for error detection using an ACK and/or NACK protocol to support HARQ operations.

Figure 4:
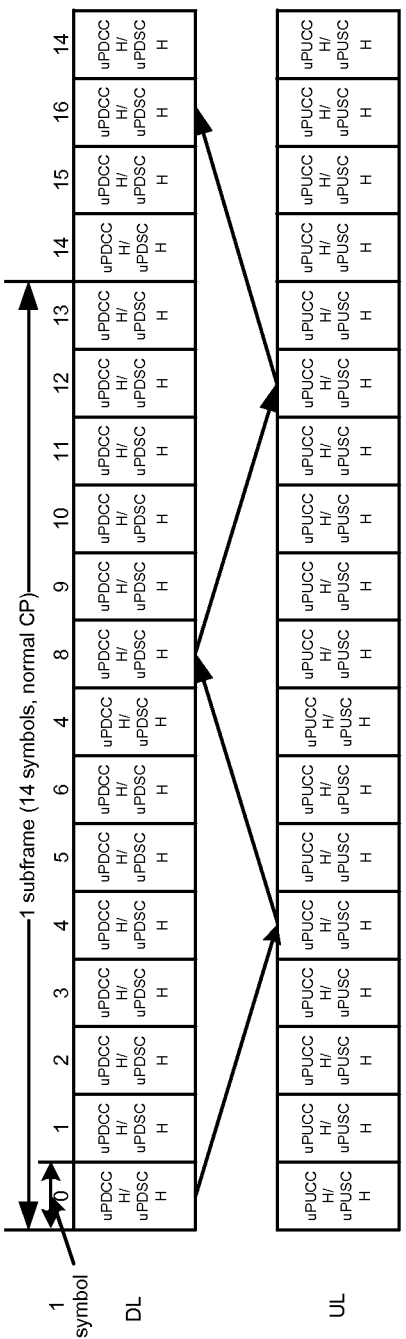
FIG. 4 is a diagram illustrating example timelines for uplink bandwidth allocation.
Figure 4:
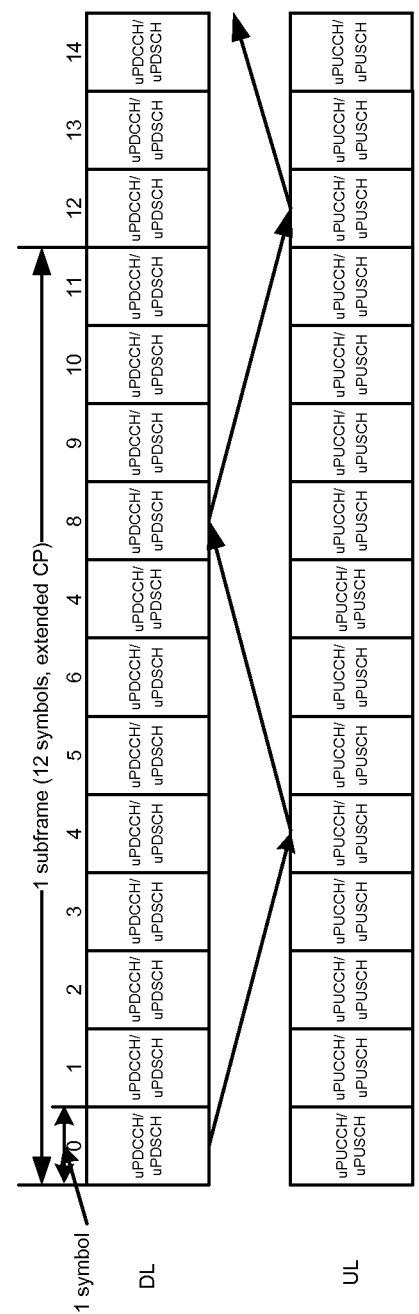

FIG. 4 is a diagram illustrating non-limiting examples of a ULL timelines 400, 402, with time progression extending from left to right in the figure, for managing ULL communications in a wireless communication system. In this example, timelines 400, 402 include ULL frames of symbol duration in each symbol of a subframe. Timelines 400, 402 both depict symbols representing a TTI for ULL physical downlink control channel (uPDCCH) and/or ULL physical downlink shared channel (uPDSCH) and symbols representing a TTI including ULL physical uplink control channel (uPUCCH) and/or ULL physical uplink shared channel (uPUSCH). In timelines 400, 14 symbols are shown within a given subframe (e.g., for normal CP), and in timelines 402, 12 symbols are shown within a given subframe (e.g., for extended CP). In either case, lower latency is achieved in ULL by utilizing symbol-based TTIs. It is to be appreciated, in other examples, that a TTI may be two or more symbols, a slot of a subframe (where a subframe includes two slots), etc. In addition, HARQ process response time can be 3 symbols (or 4 symbols, 3 dual-symbols, 3 slots, etc.). In the depicted example, uPDCCH/uPDSCH is sent in symbol 0, and HARQ is processed and is sent in symbol 4, etc. in the subframe.

Figure 5:
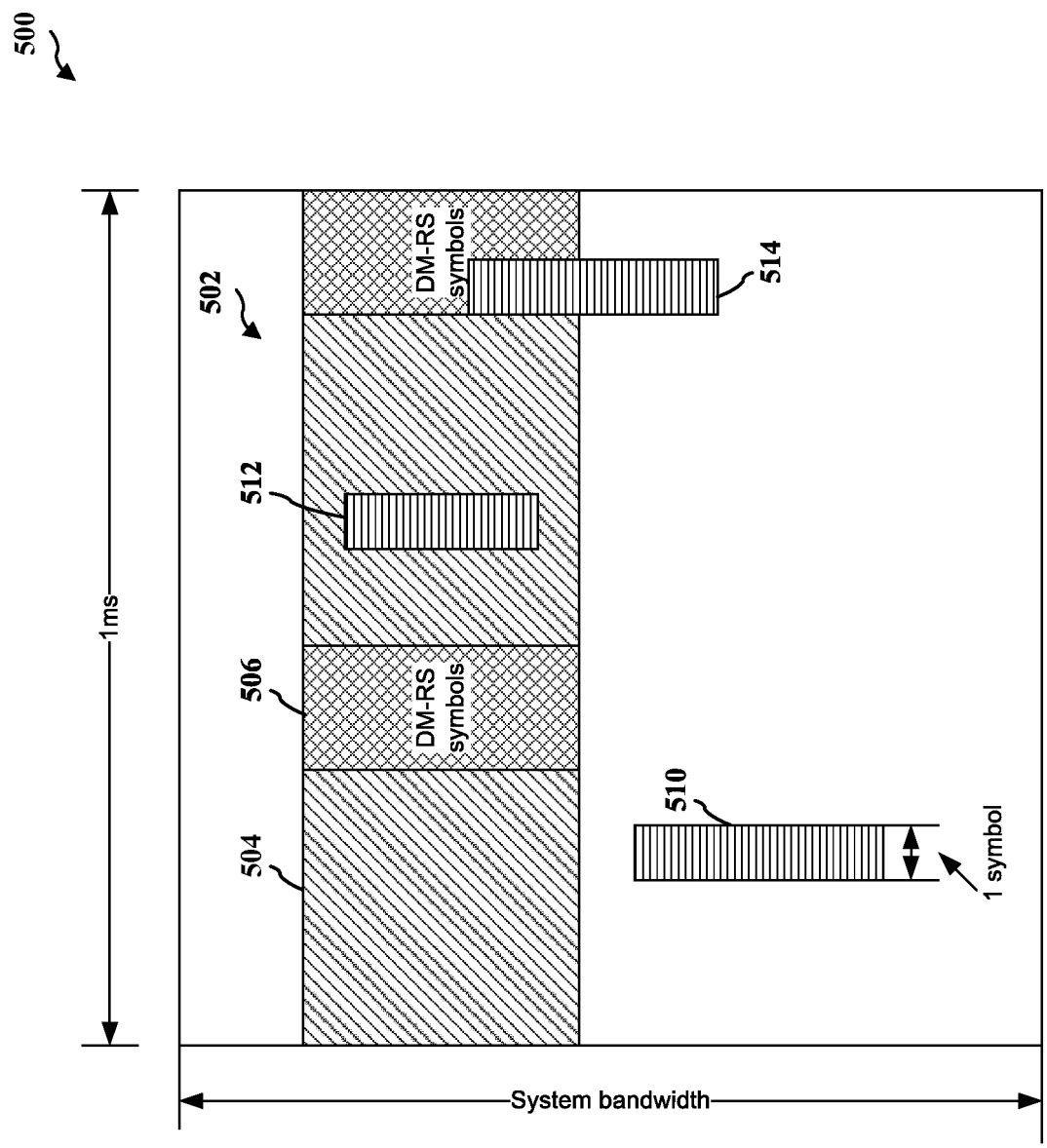
FIG. 5 is a diagram illustrating an example subframe with colliding legacy and (ultra low latency (ULL) resources.

FIG. 5 is a diagram illustrating non-limiting examples of a 1 ms subframe 500 that includes legacy downlink transmission resources 502 for a legacy communication technology. The legacy downlink transmission resources 502 can correspond to physical data shared channel (PDSCH)/enhanced physical downlink control channel (EPDCCH) transmissions in LTE, for example, and can include one or more non-DM-RS regions 504 and one or more DM-RS regions 506, where the DM-RS regions 506 include resource elements configured for DM-RS transmissions (e.g. contiguous groups of resource elements). Accordingly, as shown, ULL transmission resources may be assigned such to not overlap the legacy downlink transmission resources 502, as shown by example ULL transmission resources 510. In other examples, however, the ULL transmission resources may be assigned to overlap the legacy downlink transmission resources 502 in a non-DM-RS region 540, as shown by ULL transmission resources 512, or assigned to overlap the legacy downlink transmission resources 502 in a DM-RS region 506, as shown by ULL transmission resources 514. This can occur, for example, where an eNB assigns the ULL transmission resources 514 while transmitting over the legacy downlink transmission resources (as assignments can occur at a faster rate in ULL due to the shortened TTI).

A UE accordingly can be configured to prioritize communications where the legacy downlink transmission resources and ULL transmission resources overlap (e.g., for ULL transmission resources 512 and 514), as described further herein. In one example, the legacy downlink transmission resources 502 and ULL transmission resources 510, 512, or 514, may relate to a given UE. Thus, the UE can be configured to prioritize communications received over the legacy downlink transmission resources 502 and overlapping ULL transmission resources 512 or 514. In another example, the legacy downlink transmission resources 502 and ULL transmission resources 512, 514 may relate to different UEs, and the UE(s) related to ULL transmission resources 512, 514 may then be configured to prioritize communications received over overlapping ULL transmission resources 512 and 514 where the legacy downlink transmission resources 502 correspond to communications with one or more other UEs, as described further herein.

It is to be appreciated that, in LTE, an eNB can transmit a DM-RS in one or more code division multiplexing (CDM) groups, where the DM-RS can be multiplexed in each CDM group based on rank (e.g., a number of antennas used to transmit the DM-RS). For example, for rank less than or equal to four, the eNB can transmit the DM-RS based on a spreading factor of two such that the DM-RS is spread across two consecutive OFDM symbols in time. For rank greater than four, for example, the eNB can transmit the DM-RS based on a spreading factor of four such that the DM-RS is spread across four consecutive OFDM symbols in time.

Figure 6:
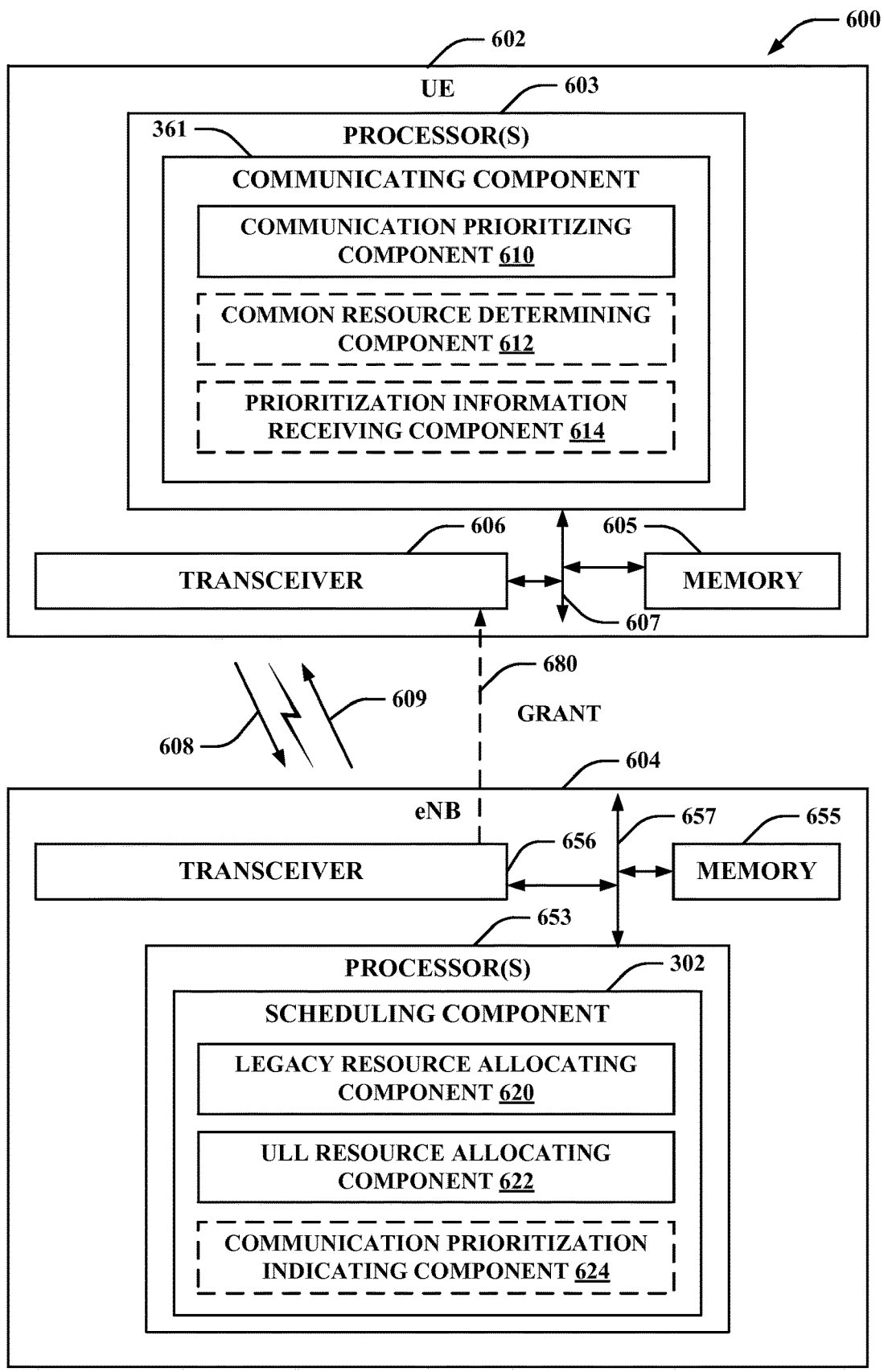
FIG. 6 is a diagram illustrating an example system for determining whether to prioritize legacy or ULL communications in accordance with aspects described herein.
Figure 7:
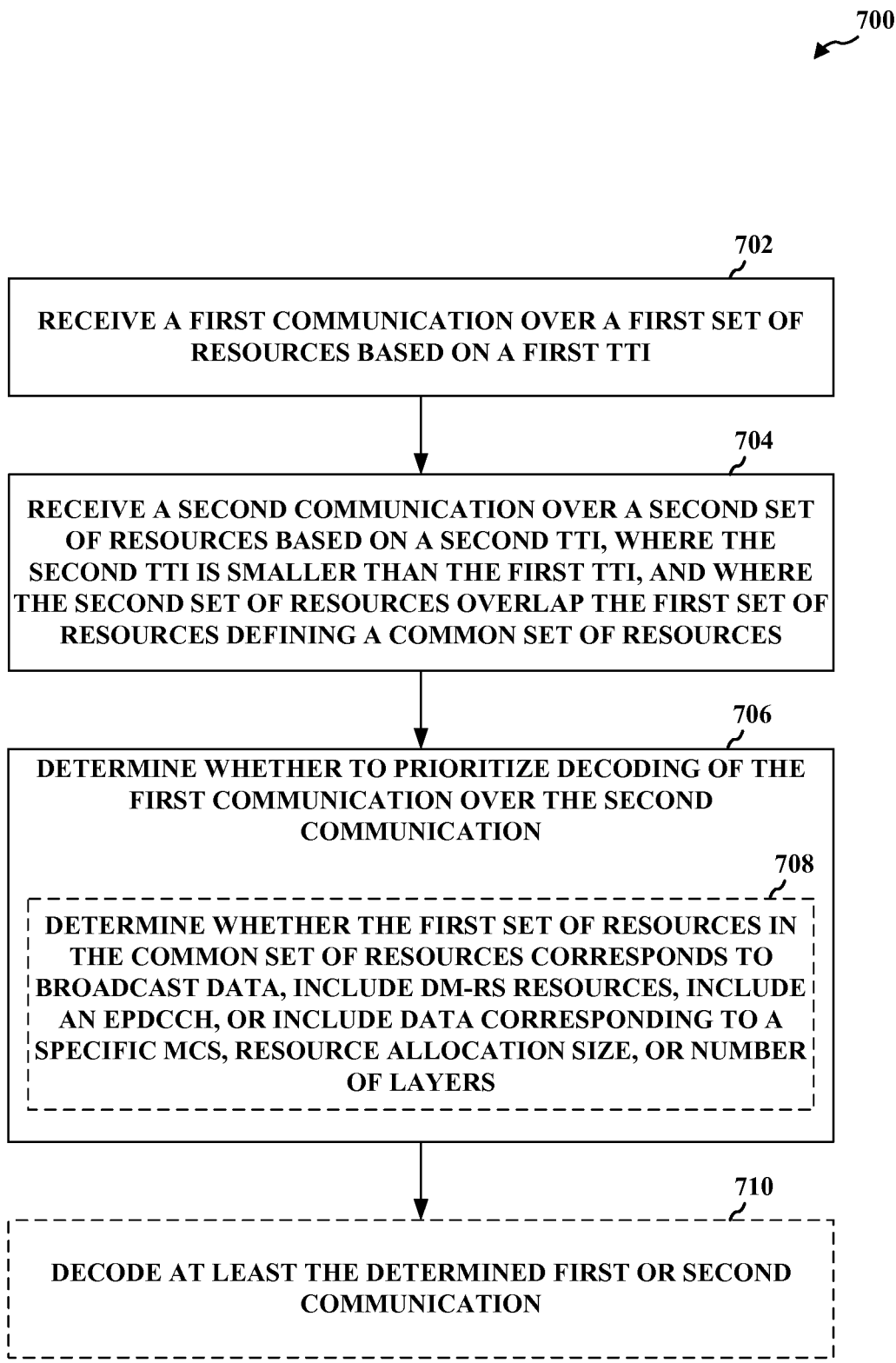
FIG. 7 is a flow chart of an example method for determining whether to prioritize legacy or ULL communications in accordance with aspects described herein.
Figure 8:
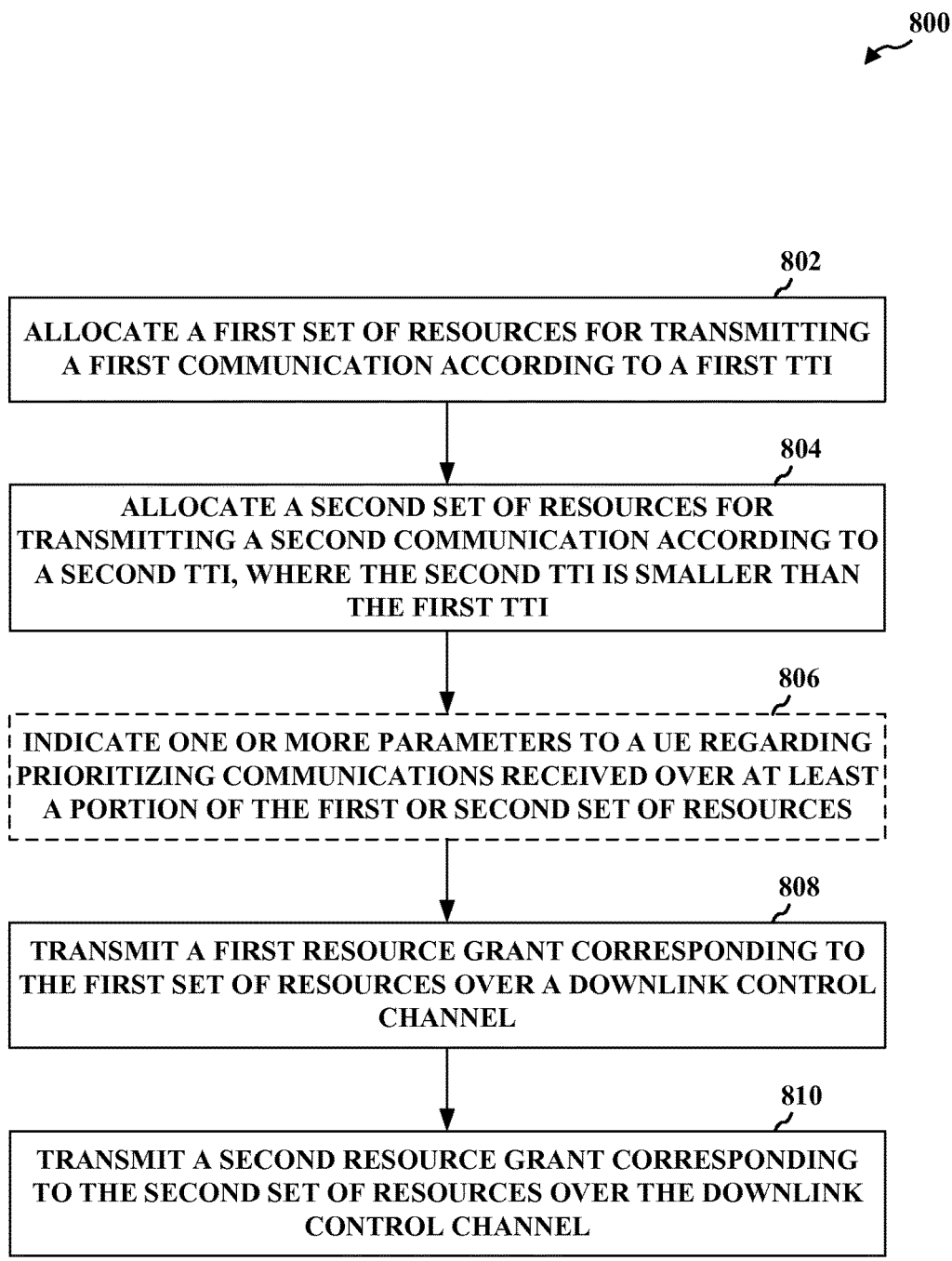
FIG. 8 is a flow chart of an example method for allocating legacy and ULL communication resources in accordance with aspects described herein.

Referring to FIGS. 6-8, aspects are depicted with reference to one or more components and one or more methods that may perform the actions or functions described herein. In an aspect, the term "component" as used herein may be one of the parts that make up a system, may be hardware or software or some combination thereof, and may be divided into other components. Although the operations described below in FIGS. 7 and 8 are presented in a particular order and/or as being performed by an example component, it should be understood that the ordering of the actions and the components performing the actions may be varied, depending on the implementation. Moreover, it should be understood that the following actions or functions may be performed by a specially-programmed processor, a processor executing specially-programmed software or computer-readable media, or by any other combination of a hardware component and/or a software component capable of performing the described actions or functions.

FIG. 6 illustrates an example system 600 for prioritizing legacy or ULL communications. System 600 includes a UE 602 that communicates with an eNB 604 to access a wireless network, examples of which are described in FIGS. 1-3 (e.g., access points 105, eNB 204, lower power class eNB 208, eNB 310, UEs 115, 206, 350, etc.), above. In an aspect, eNB 604 and UE 602 may have established one or more downlink channels over which to communicate via downlink signals 609, which can be transmitted by eNB 604 (e.g., via transceiver 656) and received by UE 602 (e.g., via transceiver 606) for communicating control and/or data messages (e.g., in signaling) from the eNB 604 to the UE 602 over configured communication resources. Moreover, for example, eNB 604 and UE 602 may have established one or more uplink channels over which to communicate via uplink signals 608, which can be transmitted by UE 602 (e.g., via transceiver 606) and received by eNB 604 (e.g., via transceiver 656) for communicating control and/or data messages (e.g., in signaling) from the UE 602 to the eNB 604 over configured communication resources. As described further herein, for example, eNB 604 may communicate a resource grant 680 that can indicate resources over which the UE 602 is to communicate (e.g., transmit or receive) data with eNB 604, where the resources can correspond to a legacy and/or ULL communication technology, as described. For example, resources related to a ULL communication technology can relate to a ULL timeline (e.g., a timeline having a TTI that is less than a subframe in duration, such as the timelines 400, 402 in FIG. 4).

In an aspect, UE 602 may include one or more processors 603 and/or a memory 605 that may be communicatively coupled, e.g., via one or more buses 607, and may operate in conjunction with or otherwise implement a communicating component 361 for receiving resource grants for legacy and/or ULL communication technologies from eNB 604 and communicating over the resources based on the resource grants. For example, the various operations related to communicating component 361 may be implemented or otherwise executed by one or more processors 603 and, in an aspect, can be executed by a single processor, while in other aspects, different ones of the operations may be executed by a combination of two or more different processors. For example, in an aspect, the one or more processors 603 may include any one or any combination of a modem processor, or a baseband processor, or a digital signal processor, or an application specific integrated circuit (ASIC), or a transmit processor, receive processor, or a transceiver processor associated with transceiver 606. Further, for example, the memory 605 may be a non-transitory computer-readable medium that includes, but is not limited to, random access memory (RAM), read only memory (ROM), programmable ROM (PROM), erasable PROM (EPROM), electrically erasable PROM (EEPROM), a magnetic storage device (e.g., hard disk, floppy disk, magnetic strip), an optical disk (e.g., compact disk (CD), digital versatile disk (DVD)), a smart card, a flash memory device (e.g., card, stick, key drive), a register, a removable disk, and any other suitable medium for storing software and/or computer-readable code or instructions that may be accessed and read by a computer or one or more processors 603. Moreover, memory 605 or computer-readable storage medium may be resident in the one or more processors 603, external to the one or more processors 603, distributed across multiple entities including the one or more processors 603, etc.

In particular, the one or more processors 603 and/or memory 605 may execute actions or operations defined by communicating component 361 or its subcomponents. For instance, the one or more processors 603 and/or memory 605 may execute actions or operations defined by a communication prioritizing component 610 for determining whether to prioritize a first or second communication respectively related to first and second resources that are based on differing TTIs that are received over common resources. In an aspect, for example, communication prioritizing component 610 may include hardware (e.g., one or more processor modules of the one or more processors 603) and/or computer-readable code or instructions stored in memory 605 and executable by at least one of the one or more processors 603 to perform the specially configured communication prioritizing operations described herein. Further, for instance, the one or more processors 603 and/or memory 605 may execute actions or operations defined by an optional common resource determining component 612 for determining common resources over which first and second communications overlap. In an aspect, for example, common resource determining component 612 may include hardware (e.g., one or more processor modules of the one or more processors 603) and/or computer-readable code or instructions stored in memory 605 and executable by at least one of the one or more processors 603 to perform the specially configured resource determining operations described herein. Further, for instance, the one or more processors 603 and/or memory 605 may optionally execute actions or operations defined by an optional prioritization information receiving component 614 for obtaining information regarding prioritizing the first or second communication over the common resources. In an aspect, for example, prioritization information receiving component 614 may include hardware (e.g., one or more processor modules of the one or more processors 603) and/or computer-readable code or instructions stored in memory 605 and executable by at least one of the one or more processors 603 to perform the specially configured information receiving operations described herein.

Similarly, in an aspect, eNB 604 may include one or more processors 653 and/or a memory 655 that may be communicatively coupled, e.g., via one or more buses 657, and may operate in conjunction with or otherwise implement a scheduling component 302 for generating the resource grants for UE 602 and/or other UEs according to the resources. For example, the various functions related to scheduling component 302 may be implemented or otherwise executed by one or more processors 653 and, in an aspect, can be executed by a single processor, while in other aspects, different ones of the functions may be executed by a combination of two or more different processors, as described above. It is to be appreciated, in one example, that the one or more processors 653 and/or memory 655 may be configured as described in examples above with respect to the one or more processors 603 and/or memory 605 of UE 602.

In an example, the one or more processors 653 and/or memory 655 may execute actions or operations defined by scheduling component 302 or its subcomponents. For instance, the one or more processors 653 and/or memory 655 may execute actions or operations defined by a legacy resource allocating component 620 for allocating a first set of resources to one or more UEs (e.g., resources over a legacy communication technology that operates based on a first TTI). In an aspect, for example, legacy resource allocating component 620 may include hardware (e.g., one or more processor modules of the one or more processors 653) and/or computer-readable code or instructions stored in memory 655 and executable by at least one of the one or more processors 653 to perform the specially configured legacy resource allocating operations described herein. Further, for instance, the one or more processors 653 and/or memory 655 may execute actions or operations defined by a ULL resource allocating component 622 for allocating a second set of resources to one or more UEs (e.g., resources over ULL communication technology that operates based on a second TTI that is shorter than the first TTI). In an aspect, for example, ULL resource allocating component 622 may include hardware (e.g., one or more processor modules of the one or more processors 653) and/or computer-readable code or instructions stored in memory 655 and executable by at least one of the one or more processors 653 to perform the specially configured ULL resource allocating operations described herein. Further, for instance, the one or more processors 653 and/or memory 655 may execute actions or operations defined by an optional communication prioritization indicating component 624 for indicating information to the one or more UEs regarding prioritizing communications over resources that overlap in the first and second resource allocations. In an aspect, for example, communication prioritization indicating component 624 may include hardware (e.g., one or more processor modules of the one or more processors 653) and/or computer-readable code or instructions stored in memory 655 and executable by at least one of the one or more processors 653 to perform the specially prioritization indicating operations described herein.

It is to be appreciated that transceivers 606, 656 may be configured to transmit and receive wireless signals through one or more antennas, an RF front end, one or more transmitters, and one or more receivers. In an aspect, transceivers 606, 656 may be tuned to operate at specified frequencies such that UE 602 and/or eNB 604 can communicate at a certain frequency. In an aspect, the one or more processors 603 may configure transceiver 606 and/or one or more processors 653 may configure transceiver 656 to operate at a specified frequency and power level based on a configuration, a communication protocol, etc. to communicate uplink signals 608 and/or downlink signals 609, respectively, over related uplink or downlink communication channels.

In an aspect, transceivers 606, 656 can operate in multiple bands (e.g., using a multiband-multimode modem, not shown) such to process digital data sent and received using transceivers 606, 656. In an aspect, transceivers 606, 656 can be multiband and be configured to support multiple frequency bands for a specific communications protocol. In an aspect, transceivers 606, 656 can be configured to support multiple operating networks and communications protocols. Thus, for example, transceivers 606, 656 may enable transmission and/or reception of signals based on a specified modem configuration.

FIG. 7 illustrates a method 700 for prioritizing (e.g., by a UE) communications over a set of resources common to first communications based on a first TTI (e.g., legacy communications) and second communications based on a shorter second TTI (e.g., ULL communications). At Block 702, the UE can receive a first communication over a first set of resources based on a first TTI. In an aspect, communicating component 361 (FIG. 6) can receive (e.g., via transceiver 606) the first communication over the first set of resources based on the first TTI. In one example, the first communication can correspond to broadcast data transmitted by eNB 604, such as control or traffic data relating to system information transmissions, paging transmissions, random access transmissions, etc. In another example, the first communication can correspond to unicast data that may or may not relate to UE 602, such as control or traffic data, reference signals, etc. In a specific example, the first communication can correspond to a PDSCH/EPDCCH of the legacy communication technology (e.g., LTE), one or more DM-RS symbols, and/or the like. It is to be appreciated that eNB 604 can allocate the first and/or second resources to the UE 602 for receiving communications from eNB 604, as described further herein.

At Block 704, the UE can receive a second communication over a second set of resources based on a second TTI, where the second TTI is smaller than the first TTI, and where the second set of resources overlap the first set of resources defining a common set of resources. In an aspect, communicating component 361 can similarly receive (e.g., via transceiver 606) the second communication over the second set of resources based on the second TTI, where the second TTI is smaller than the first TTI, and where the second set of resources overlap the first set of resources defining a common set of resources. In one example, the second communication can correspond to control or traffic data of a ULL communication technology (e.g., ULL LTE) having a smaller TTI than the legacy communication technology of the first communication. In one example, the first TTI can be a subframe in duration (e.g., where the first communication relates to LTE), and the second TTI can be a symbol, two symbols, a slot, etc. in duration. As described, the first and second sets of resources may overlap as shown in FIG. 5, for example, where the first set of resources can correspond to resources in the legacy downlink transmission resources 502, and the second set of resources can correspond to resources in one or more of ULL transmission resources 512 or 514.

Accordingly, at Block 706, the UE can determine whether to prioritize decoding of the first communication over the second communication. In an aspect, communication prioritizing component 610 can determine whether to prioritize decoding of the first communication over the second communication. This can include common resource determining component 612 determining the common set of resources among the first and second communications, and communication prioritizing component 610 determining certain aspects of the common resources. For example, common resource determining component 612 may determine the common set of resources based at least in part on receiving allocation information for the first set of resources and/or the second set of resources from eNB 604, and determining the resources that overlap among the first and second sets of resources. In an example, the UE 602 can be configured with the second set of resources for receiving the second communication in a ULL communication technology, and can receive communications in control data relating to the legacy communication technology to determine the first set of resources for the first communication. For example, common resource determining component 612 can receive a physical downlink control channel (PDCCH) from eNB 604 relating to the first set of resources, which can specify utilization of the first set of resources (e.g., for broadcast data, unicast data, such as PDSCH/PDCCH, etc.). Communication prioritizing component 610 can accordingly determine to prioritize a communication based at least in part on common resource determining component 612 detecting the common set of resources.

In addition, in an example, communication prioritizing component 610 can prioritize the first or second communications based on one or more aspects of the common set of resources. For example, at Block 708, the UE can optionally determine whether the first set of resources in the common set of resources corresponds to broadcast data, include DM-RS resources, include an EPDCCH, or include data corresponding to a specific MCS, resource allocation size, or a number of layers. In an example, common resource determining component 612 may determine whether at least the first set of resources in the common set of resources corresponds to broadcast data, include DM-RS resources, include an EPDCCH, or include data corresponding to a specific MCS, resource allocation size, or a number of layers. For example, communication prioritizing component 610 may be configured for determining whether to prioritize the first communication or the second communication based on the determination by common resource determining component 612. In an example, the determination can be further based on a configuration or other information received from eNB 604 or another network node, a configuration stored in memory of the UE 602, etc. that specifies when to prioritize the first or second communications based on the associated content of the first set of resources in the common set of resources. In a specific example, communication prioritizing component 610 may prioritize reception of the first communication in decoding communications received over the common set of resources where the first set of resources in the common set of resources at least one of correspond to broadcast data, include DM-RS resources, include an EPDCCH, or include data corresponding to a specific MCS, resource allocation size, or number of layers. Similarly, communication prioritizing component 610 may otherwise prioritize reception of the second communication in decoding communications received over the common set of resources.

For example, communication prioritizing component 610 can determine whether the first set of resources in the common set of resources correspond to broadcast data. For example, UE 602 can be aware of both the legacy broadcast channels (e.g., based on decoding PDCCH from the eNB 604) and ULL channels (e.g., based on receiving an allocation of the second set of resources that correspond to the ULL channels). In one example, communicating component 361 can decode the PDCCH corresponding to a radio network temporary identifier (RNTI) (e.g., a system information (SI)-RNTI, paging (P)-RNTI, random access (RA)-RNTI, etc.) of UE 602 to determine whether broadcast data is present in the first set of resources. If so, common resource determining component 612 can determine whether the first set of resources overlaps the second communication (e.g., ULL data) over the second set of resources, where the overlapping resources define a common set of resources. Where there is overlap, communication prioritizing component 610 can determine to prioritize reception of the broadcast data at least in the common set of resources instead of receiving the second communication. In this example, communication prioritizing component 610 may determine to receive the second communication in the remaining resources of the second set of resources that do not overlap. In either case, prioritizing broadcast data in this regard can ensure the UE 602 receives the broadcast data from eNB 604, which may be more critical than ULL data.

In another example, communication prioritizing component 610 can determine whether the first set of resources in the common set of resources correspond to DM-RS resources for DM-RS transmissions or otherwise include one or more DM-RS transmissions in a legacy communication technology. This can include communicating component 361 determining the first set of resources as related to or including a DM-RS region of resources reserved for transmitting DM-RS in the legacy communication technology (e.g., DM-RS region 506 in FIG. 5), which may be based on in part on decoding a DM-RS over the region of resources, prioritization information receiving component 614 receiving an indication of the actual resource elements within the DM-RS region used for DM-RS transmission from eNB 604 (e.g., in a DM-RS configuration received from eNB 604 or another network entity), which may include a DM-RS configuration for rate matching around the DM-RSs in decoding legacy communications, etc. Where DM-RS resources are overlapped with ULL data resources, if one slot of the DM-RS is punctured, it may be possible to decode the legacy channels based on the DM-RS for rank less than or equal to four. If both slots of the DM-RS are punctured, however, it may not be possible to decode legacy channels as the DM-RS may not be effectively processed.

In any case, UE 602 can be aware of resources reserved or used for DM-RS transmission (referred to as DM-RS related resources) in the legacy communication technology (e.g., over the first set of resources) and ULL channels (e.g., based on receiving an allocation of the second set of resources that correspond to the ULL channels). Common resource determining component 612 can accordingly determine whether the DM-RS related resources overlap the second communication (e.g., ULL data) over the second set of resources, where overlapped resources can define a common set of resources. An example of overlapped ULL resources is shown in FIG. 5 as ULL transmission resources 514 overlapping a DM-RS region 506. Where there is overlap in a set of common resources, communication prioritizing component 610 can determine to prioritize reception of the first communication (e.g., over the DM-RS related resources) at least in the common set of resources instead of receiving the second communication. In this example, communication prioritizing component 610 may determine to receive the second communication in the remaining resources of the second set of resources.

In more specific examples, communication prioritizing component 610 can determine to prioritize reception of the first communication over the common set of resources and/or receiving the first communication over specific resources within the common set of resources over which DM-RSs are transmitted. For example, communication prioritizing component 610 can determine to prioritize reception of the first communication over the common set of resources that correspond to a DM-RS symbol in the legacy communication technology, that correspond to specific resource elements over which the DM-RS is transmitted, etc. In one example, prioritization information receiving component 614 may receive an indication of which resource elements in which symbols include DM-RS transmissions (e.g., in a DM-RS configuration from eNB 604). Accordingly, communication prioritizing component 610 can determine to prioritize reception of the second communication over the second set of resources outside the common set of resources and/or receiving the second communication over resource elements within the common set of resources other than the symbols or the specific resource elements within the symbols over which DM-RSs are transmitted. In yet another example, communication prioritizing component 610 can determine to prioritize reception of the first communication over a fraction or a single one of specific resource elements within the common set of resources over which DM-RSs are transmitted, and communication prioritizing component 610 can accordingly determine to receive the second communication in remaining resource elements in the common set of resources.

In another example, where the first set of resources does not relate to broadcast data and does not include DM-RS (e.g., resources in non-DM-RS region 504), communication prioritizing component 610 can determine whether the first set of resources in the common set of resources includes an EPDCCH or data corresponding to a specific MCS, resource allocation size, or number of layers, which can be given a higher priority in some examples. This can include communicating component 361 decoding a PDCCH from the eNB 604 corresponding to the first set of resources to determine whether the first set of resources includes an EPDCCH, a specific MCS, a specific, resource allocation size, or a specific number of layers. For example, data with a higher MCS (e.g., an MCS achieving a threshold MCS or corresponding to one or more specified MCSs), resource allocation size (e.g., a resource allocation size achieving a threshold allocation size or corresponding to one or more specified allocation sizes), or number of layers (e.g., a number of layers achieving a threshold number of layers or corresponding to one or more specified numbers of layers) may be indicative of data which is sensitive to resource availability. As an example, a combination of MCS and a resource allocation size resulting in a high coding size (e.g., >0.5) may be sensitive to resource availability if some of the allocated resources are re-allocated and thus become unavailable. As another example, a data transmission with two or more layers may be more sensitive to resources being overtaken as well. Thus, in these cases for example, communication prioritizing component 610 can determine to prioritize this data to help ensure receipt of the data. Common resource determining component 612 can accordingly determine whether the first resources including the EPDCCH or relating to the specific MCS, resource allocation size, or number of layers overlap the second communication (e.g., ULL data) over the second set of resources, which can define a common set of resources. Where there is overlap in a set of common resources, communication prioritizing component 610 can determine to prioritize reception of the first communication (e.g., the EPDCCH or data having a specific MCS, resource allocation size, number of layers, etc.) at least in the common set of resources instead of the second communication. In this example, communication prioritizing component 610 may determine to receive the second communication in the remaining resources of the second set of resources.

In the above examples, it is described that the common resource determining component 612 determines whether a common set of resources exist after it is determined that the first set of resources relate to specific transmissions. It is to be appreciated, however, that the common resource determining component 612 can determine the common resources before determining whether the first set of resources relate to specific transmissions. In this example, no determination regarding the transmissions occurring over the first set of resources may need to be made where common resource determining component 612 does not detect overlapping resources with the second set of resources.

Moreover, it is to be appreciated that communication prioritizing indicating component 624 can configure the above described functions of communication prioritizing component 610, which the prioritization information receiving component 614 can receive and communication prioritizing component 610 can utilize in providing the above-described prioritization of communications over resources granted to UE 602. In this regard, scheduling component 302 can transmit the first communication over the first set of resources and the second communication over the second set of resources, while selecting the first or second communication for transmission over the common set of resources to facilitate the UE 602 receiving the appropriate communication according to the configurations described above.

In another example, a UE 602 may treat the case of overlapped first and second set of resources as an error event. In other words, the UE 602 may not be expected to receive the first communication and the second communication using a common set of resources. In this case, if common resource determining component 612 detects overlapped transmissions for the first communication and the second communication, the communicating component 361 can discard at least one of the two communications. The discarding can be dependent on some rules, similar to the ones discussed above, which may be configured in UE 602 (e.g., by eNB 604 or another network entity) or otherwise stored in a related configuration at UE 602, etc.

In addition, for example, communicating component 361 may concurrently receive the first communication and second communication over the common set of resources, and can perform interference cancelation in decoding respective communications. In addition, in an example, communicating component 361 may concurrently receive the first communication and second communication over the first and second sets of resources that are not in a common set of resources. Thus, for example, where common resource determining component 612 does not determine common resources among the first and second communications, communicating component 361 can receive and decode both the first and second communications without prioritization by communication prioritizing component 610.

In an optional aspect, at Block 710, the UE may decode at least a portion of the first communication or second communication based on the determined prioritization. In an example, communicating component 361 may assist with the decoding.

In another example, the first or second set of resources may correspond to a different UE, and thus one UE may not be aware that the resources overlap with resources assigned to the other UE. FIG. 8 illustrates a method 800 for managing (e.g., by an eNB) resource allocation to avoid overlapping and/or provide information to UE(s) related to prioritizing the communications. At Block 802, the eNB can allocate a first set of resources for transmitting a first communication according to a first TTI, and at Block 804, the eNB can allocate a second set of resources for transmitting a second communication according to a second TTI, where the second TTI is smaller than the first TTI. In an aspect, legacy resource allocating component 620 (FIG. 6) can allocate the first set of resources for transmitting the first communication according to the first TTI, and ULL resource allocating component 622 can allocate the second set of resources for transmitting the second communication according to the second TTI. As described, the first TTI can be a subframe in duration (e.g., where the first communication relates to LTE), and the second TTI can be a symbol, two symbols, a slot, etc. in duration. Moreover, the first set of resources and the second set of resources may correspond to the same or different UEs. In any case, ULL resource allocating component 622 may attempt to avoid overlap with the first set of resources in allocating the second set of resources and/or vice versa.

For example, however, complete avoidance of overlap may not occur or may not be possible in some cases. In an example, ULL resource allocating component 622 may try to allocate the second set of resources in a set of common resources that overlap the first set of resources by determining the first set of resources as relating to one or more channels less sensitive to puncturing. For example, ULL resource allocating component 622 may determine a second set of resources related to channels in the legacy wireless technology with a specific MCS, resource allocation size, number of layers, etc., such as an MCS, resource allocation size, number of layers, etc. below a threshold, for allocating to the UE 602 to facilitate ULL communications. In another example, ULL resource allocating component 622 may try to allocate the second set of resources in a set of common resources that overlap the first set of resources in non-DM-RS regions such to avoid interfering with DM-RS transmissions (or at least avoid overlapping all symbols of the DM-RS).

In these or other examples, at Block 806, the eNB may optionally indicate one or more parameters to a UE regarding prioritizing communications received over at least a portion of the first or second set of resources. In an aspect, communication prioritization indicating component 624 can indicate the one or more parameters to the UE 602 regarding prioritizing communications received over at least a portion of the first or second set of resources that are overlapped. Prioritization information receiving component 614 can receive the indication, and communication prioritizing component 610 can accordingly prioritize communications over the first or second resources based at least in part on the indication. For example, the indication may indicate resource unavailability in the second set of resources (e.g., for a uPDCCH assignment) relating to the first set of resources (e.g., puncturing of at least a portion of the second set of resources for communications over the second set of resources—which may relate to another UE), and thus communication prioritizing component 610 can determine to not receive the second communication in at least a portion of the second set of resources that may overlap with the first set of resources, as described, based on the indication. For example, the indication may include one or more uPDCCH bits that can be processed by ULL UEs. In another example, the first set of resources may include one or more REs over which a DM-RS is transmitted (e.g., for a different UE). In this example, the indication may specify the DM-RS symbols, the DM-RS resource elements, or otherwise relate to whether or not to perform rate matching for the second communication around DM-RS REs in assigned resource blocks (e.g., where the DM-RS REs may overlap with legacy transmissions in the first set of resources). In this example, communication prioritizing component 610 can accordingly determine whether to rate match around the associated DM-RS REs in decoding the second communication based on the indication.

At Block 808, the eNB may transmit the first resource grant corresponding to the first set of resources over a downlink control channel, and at Block 810, may transmit the second resource grant corresponding to the second set of resources over the downlink control channel. In an aspect, scheduling component 302 can transmit the first resource grant (e.g., resource grant 680) corresponding to the first set of resources over the downlink control channel (e.g., to one or more UEs), and can transmit the second resource grant (e.g., resource grant 680) corresponding to the second set of resources over the downlink control channel (e.g., to the one or more UEs or one or more different UEs). In an example, ULL resource allocating component 622 can allocate the second set of resources (e.g., at Block 804) while scheduling component 302 is transmitting a first communication over the allocated first set of resources. This situation may not allow for planning allocation of the ULL resources, which may lead to the overlapping resources described in FIG. 5.

It is understood that the specific order or hierarchy of steps in the processes disclosed is an illustration of exemplary approaches. Based upon design preferences, it is understood that the specific order or hierarchy of steps in the processes may be rearranged. Further, some steps may be combined or omitted. The accompanying method claims present elements of the various steps in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." Unless specifically stated otherwise, the term "some" refers to one or more. All structural and functional equivalents to the elements of the various aspects described herein that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed as a means plus function unless the element is expressly recited using the phrase "means for."

What is claimed is:

1. A method of wireless communication, comprising:
   receiving a first communication over a first set of resources based on a first transmission time interval (TTI);
   receiving a second communication over a second set of resources based on a second TTI, wherein the second TTI is smaller than the first TTI, and wherein the second set of resources overlap the first set of resources defining a common set of resources;
   receiving, over a downlink control channel, one or more parameters indicating unavailability of one of the first set of resources or the second set of resources; and
   determining, based at least in part on the one or more parameters, whether to prioritize decoding of the first communication over the second communication or decoding of the second communication over the first communication,
   wherein the one or more parameters indicate unavailability of the second set of resources, and wherein determining whether to prioritize comprises determining, based on the one or more parameters, to prioritize the decoding of the first communication over the second communication, and
   wherein the downlink control channel is based on the second TTI.

2. The method of claim 1, further comprising determining at least one of the first set of resources or the second set of resources based at least in part on receiving at least one downlink control channel.

3. The method of claim 1, wherein determining whether to prioritize comprises determining to prioritize decoding of the first communication based at least in part on determining that the first set of resources corresponds to resources for communicating broadcast data.

4. The method of claim 1, wherein determining whether to prioritize comprises determining to prioritize decoding of the first communication based at least in part on determining that at least a portion of the common set of resources corresponds to at least one demodulation reference signal (DM-RS).

5. The method of claim 4, wherein determining whether to prioritize comprises:
   determining to prioritize decoding of the first communication over at least the portion of the common set of resources corresponding to the at least one DM-RS; and
   determining to prioritize decoding of the second communication over a remaining portion of the common set of resources.

6. The method of claim 4, wherein determining that at least the portion of the common set of resources corresponds to the at least one DM-RS is based at least in part on a DM-RS configuration received over a downlink control channel.

7. The method of claim 1, wherein determining whether to prioritize comprises determining to prioritize decoding of the first communication based at least in part on determining that at least a portion of the common set of resources includes an enhanced physical downlink control channel.

8. The method of claim 1, wherein determining whether to prioritize comprises determining to prioritize decoding of the first communication based at least in part on determining that at least a portion of the common set of resources includes shared channel data corresponding to at least one or more specific modulation and coding schemes, a resource allocation size, or a number of layers.

9. A user equipment for wireless communication, comprising:
   a transceiver;
   at least one processor communicatively coupled with the transceiver via a bus for communicating signals in a wireless network; and
   a memory communicatively coupled with the at least one processor and/or the transceiver via the bus;
   wherein the at least one processor and the memory are operable to:
      receive, via the transceiver, a first communication over a first set of resources based on a first transmission time interval (TTI);
      receive, via the transceiver, a second communication over a second set of resources based on a second TTI, wherein the second TTI is smaller than the first TTI, and wherein the second set of resources overlap the first set of resources defining a common set of resources;
      receive, via the transceiver, over a downlink control channel, one or more parameters indicating unavailability of one of the first set of resources or the second set of resources; and
      determine, based at least in part on the one or more parameters, whether to prioritize decoding of the first communication over the second communication or decoding of the second communication over the first communication,
   wherein the one or more parameters indicate unavailability of the second set of resources, and wherein the at least one processor and the memory are operable to determine, based on the one or more parameters, to prioritize the decoding of the first communication over the second communication, and
   wherein the downlink control channel is based on the second TTI.

10. The user equipment of claim 9, wherein the at least one processor and the memory are further operable to determine at least one of the first set of resources or the second set of resources based at least in part on receiving at least one downlink control channel.

11. The user equipment of claim 9, wherein the at least one processor and the memory are operable to determine to prioritize decoding of the first communication based at least in part on determining that the first set of resources corresponds to resources for communicating broadcast data.

12. The user equipment of claim 9, wherein the at least one processor and the memory are operable to determine to prioritize decoding of the first communication based at least in part on determining that at least a portion of the common set of resources corresponds to at least one demodulation reference signal (DM-RS).

13. The user equipment of claim 12, wherein the at least one processor and the memory are operable to:
   determine to prioritize decoding of the first communication received over at least the portion of the common set of resources corresponding to the at least one DM-RS; and
   determine to prioritize decoding of the second communication over a remaining portion of the common set of resources.

14. The user equipment of claim 12, wherein the at least one processor and the memory are operable to determine that at least the portion of the common set of resources corresponds to the at least one DM-RS based at least in part on a DM-RS configuration received over a downlink control channel.

15. The user equipment of claim 9, wherein the at least one processor and the memory are operable to determine to prioritize decoding of the first communication based at least in part on determining that at least a portion of the common set of resources includes an enhanced physical downlink control channel.

16. The user equipment of claim 9, wherein the at least one processor and the memory are operable to determine to prioritize decoding of the first communication in decoding communications received over the common set of resources based at least in part on determining that at least a portion of the common set of resources includes shared channel data corresponding to at least one or more specific modulation and coding schemes, a resource allocation size, or a number of layers.

17. An apparatus for wireless communication, comprising:
   means for receiving a first communication over a first set of resources based on a first transmission time interval (TTI);
   means for receiving a second communication over a second set of resources based on a second TTI, wherein the second TTI is smaller than the first TTI, and wherein the second set of resources overlap the first set of resources defining a common set of resources;

means for receiving, over a downlink control channel, one or more parameters indicating unavailability of one of the first set of resources or the second set of resources; and means for determining, based at least in part on the one or more parameters, whether to prioritize decoding of the first communication over the second communication or decoding of the second communication over the first communication, wherein the one or more parameters indicate unavailability of the second set of resources, and wherein the means for determining whether to prioritize determines, based on the one or more parameters, to prioritize the decoding of the first communication over the second communication, and wherein the downlink control channel is based on the second TTI.

18. The apparatus of claim 17, further comprising means for determining at least one of the first set of resources or the second set of resources based at least in part on receiving at least one downlink control channel.

19. A non-transitory computer-readable medium comprising code executable by one or more processors for wireless communications, wherein the code comprises:

code for receiving a first communication over a first set of resources based on a first transmission time interval (TTI);

code for receiving a second communication over a second set of resources based on a second TTI, wherein the second TTI is smaller than the first TTI, and wherein the second set of resources overlap the first set of resources defining a common set of resources;

code for receiving, over a downlink control channel, one or more parameters indicating unavailability of one of the first set of resources or the second set of resources; and code for determining, based at least in part on the one or more parameters, whether to prioritize decoding of the first communication over the second communication or decoding of the second communication over the first communication, wherein the one or more parameters indicate unavailability of the second set of resources, and wherein the code for determining whether to prioritize determines, based on the one or more parameters, to prioritize the decoding of the first communication over the second communication, and wherein the downlink control channel is based on the second TTI.

20. The non-transitory computer-readable medium of claim 19, further comprising code for determining at least one of the first set of resources or the second set of resources based at least in part on receiving at least one downlink control channel.

* * * * *